(12) United States Patent
Broccardo et al.

(10) Patent No.: US 6,585,202 B2
(45) Date of Patent: Jul. 1, 2003

(54) MULTI-TIERED CARRIER STRUCTURE FOR A MOTOR VEHICLE

(75) Inventors: Natalino Broccardo, Northville, MI (US); Randy T Stratman, Waterford, MI (US); Nathan C Burns, Dearborn, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/754,917

(22) Filed: Jan. 5, 2001

(65) Prior Publication Data

US 2002/0088908 A1 Jul. 11, 2002

(51) Int. Cl.⁷ .............................................. F16M 11/00
(52) U.S. Cl. ....................... 248/200; 248/903; 296/188; 52/731.6; 52/735.1
(58) Field of Search ................................ 248/200, 903; 296/187, 204, 206, 188; 52/731.6, 735.1, 731.2, 732.1, 309.4, 404.1, 309.14, 406.2, 309.9

(56) References Cited

U.S. PATENT DOCUMENTS

| | | | |
|---|---|---|---|
| 4,737,407 A | 4/1988 | Wycech | 428/323 |
| 4,751,249 A | 6/1988 | Wycech | 521/54 |
| 4,769,391 A | 9/1988 | Wycech | 521/54 |
| 4,836,516 A | 6/1989 | Wycech | 267/279 |
| 4,853,270 A | 8/1989 | Wycech | 428/68 |
| 4,861,097 A | 8/1989 | Wycech | 296/188 |
| 4,901,500 A | 2/1990 | Wycech | 52/793 |

(List continued on next page.)

FOREIGN PATENT DOCUMENTS

| | | |
|---|---|---|
| EP | 0 891 918 A1 | 1/1999 |
| EP | 0 893 331 A1 | 1/1999 |
| EP | 0 893 332 A1 | 1/1999 |
| EP | 0 891 918 B1 | 2/2001 |
| EP | 0 893 331 B1 | 3/2001 |
| EP | 0 893 332 B1 | 3/2002 |
| WO | WO 97/43501 | 11/1997 |
| WO | WO 98/50221 | 11/1998 |
| WO | WO 99/08854 | 2/1999 |
| WO | WO 99/39882 | 8/1999 |
| WO | WO 99/41468 | 8/1999 |
| WO | WO 99/50057 | 10/1999 |
| WO | WO 00/12595 | 3/2000 |
| WO | WO 01/54936 A1 | 8/2001 |
| ZA | 9805427 A | 6/1998 |

*Primary Examiner*—Gwendolyn Baxter
(74) *Attorney, Agent, or Firm*—Mark P. Calcaterra

(57) ABSTRACT

A structural reinforcing member is provided to improve localized stiffness in frames, rails, body cavities or other such areas found in automotive, marine or aviation applications. The reinforcing member includes a frame having a first and second arm extending laterally therefrom. The frame is configured to be securely positioned in the area of interest. A thermally expandable material is disposed on the arms such that a gap is formed between the thermally expandable material of the first arm and the adjacent second arm prior to expansion. A bake process allows the expandable material to expand around the immediate area, thereby providing localized stiffness and support.

9 Claims, 3 Drawing Sheets

U.S. PATENT DOCUMENTS

| | | | |
|---|---|---|---|
| 4,908,930 A | 3/1990 | Wycech | 29/527.2 |
| 4,922,596 A | 5/1990 | Wycech | 29/897.2 |
| 4,923,902 A | 5/1990 | Wycech | 521/54 |
| 4,978,562 A | 12/1990 | Wycech | 428/35.8 |
| 4,995,545 A | 2/1991 | Wycech | 228/119 |
| 5,124,186 A | 6/1992 | Wycech | 428/35.8 |
| 5,575,526 A | 11/1996 | Wycech | 296/205 |
| 5,755,486 A | 5/1998 | Wycech | 296/188 |
| 5,884,960 A | 3/1999 | Wycech | 296/146.6 |
| 5,888,600 A | 3/1999 | Wycech | 428/35.9 |
| 5,992,923 A | 11/1999 | Wycech | 296/188 |
| 6,003,274 A | 12/1999 | Wycech | 52/232 |
| 6,058,673 A | 5/2000 | Wycech | 52/721.4 |
| 6,068,424 A | 5/2000 | Wycech | 403/269 |
| 6,079,180 A | 6/2000 | Wycech | 52/731.6 |
| 6,092,864 A | 7/2000 | Wycech et al. | 296/204 |
| 6,096,403 A | 8/2000 | Wycech | 428/122 |
| 6,103,784 A | 8/2000 | Hilborn et al. | 523/219 |
| 6,149,227 A * | 11/2000 | Wycech | 296/188 |
| 6,158,190 A * | 12/2000 | Seng | 52/731.5 |
| 6,165,588 A | 12/2000 | Wycech | 428/122 |
| 6,168,226 B1 | 1/2001 | Wycech | 296/146.6 |
| 6,189,953 B1 | 2/2001 | Wycech | 296/188 |
| 6,233,826 B1 | 5/2001 | Wycech | 29/897.1 |
| 6,237,304 B1 | 5/2001 | Wycech | 52/731.6 |
| 6,253,524 B1 * | 7/2001 | Hopton et al. | 52/731.2 |
| 6,270,600 B1 | 8/2001 | Wycech | 156/79 |
| 6,272,809 B1 | 8/2001 | Wycech | 52/731.6 |
| 6,287,666 B1 | 9/2001 | Wycech | 428/122 |
| 6,305,136 B1 * | 10/2001 | Hopton et al. | 52/309.7 |
| 6,332,731 B1 | 12/2001 | Wycech | 403/171 |
| 6,348,513 B1 | 2/2002 | Hilborn et al. | 521/95 |

* cited by examiner

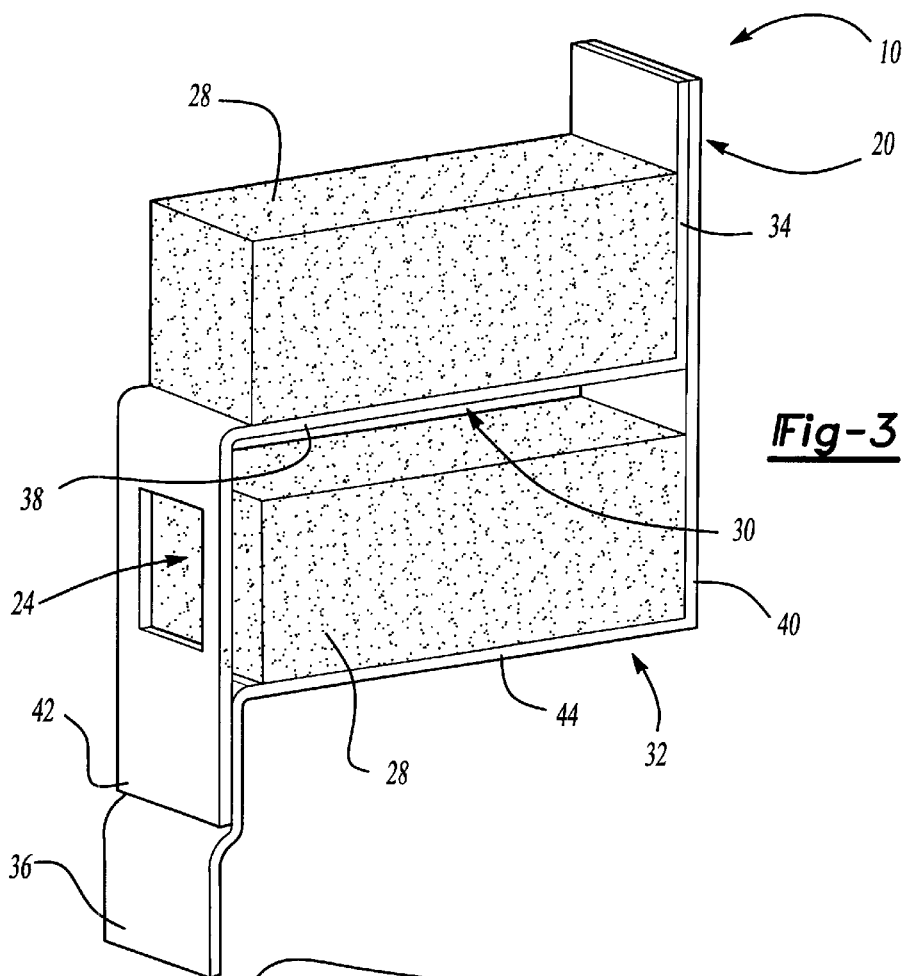
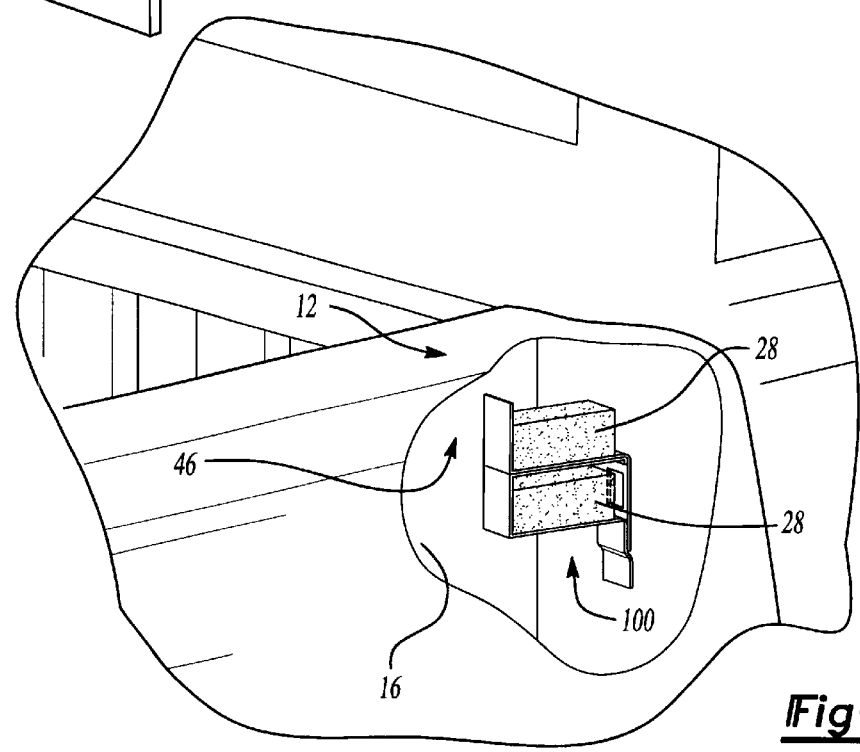

MULTI-TIERED CARRIER STRUCTURE FOR A MOTOR VEHICLE

FIELD OF THE INVENTION

The present invention relates generally to thermally expansible structural reinforcing members used to provide localized stiffness to frames, cavities, panels or other structural members, and more particularly to a reinforcing member including a base and a series of laterally extending arms each having a portion of thermally expansible reinforcing material secured thereto.

BACKGROUND

The design of automobiles, aircraft, watercraft and other common vehicles incorporate body structures having hollow cavities and open frame sections. The hollow cavities are commonly formed when it is desired to have an inner and outer wall defining a preferred structural or aesthetic characteristic. It is common for such structures to experience linear and rotational forces generated from environmental inputs associated with a given common vehicle. Such forces may encourage unwanted noise or premature fatigue failure in the structure.

It is frequently desirable to reinforce these areas for purposes of improving the structural integrity of the body. Increased stiffness in localized critical areas generally result in reduced vibration, noise, and/or fatigue propagation. Additionally, an increased stiffness in these areas generally has proven to improve energy management during crash or impact situations.

It is known to reinforce such areas by introducing self-sustaining reinforcing products into the cavity. The reinforcing products may include a support or carrier structure used to hold the material in the desired location. While this known technique has generally proven to provide increased stiffness, it adds access weight to the structural member.

Another known technique incorporates the use of a thermally expandable reinforcing material. The reinforcing material is positioned in a cavity and is heated during thermal convection activation process. The material is configured to expand and contact the surrounding cavity walls during a bake process. Often, however, the expandable material is disposed or arranged on a carrier or frame such that effective thermal exposure is difficult. Failure to fully penetrate the expandable material with heat results in inconsistent material density after expansion. It is therefore desirable to provide a frame and expandable material configuration such that the thermal activation process enables full heat penetration throughout the structure, thereby yielding a more consistent reinforcing structure.

SUMMARY OF THE INVENTION

It is a general object of the present invention to provide a reinforcing support having a rigid frame including a first and second laterally displaced shelf members, the shelf members carrying thermally expandable material thereon.

In one form, the present invention provides a reinforced structural member having a frame including a first mounting portion and first and second shelf members laterally extending therefrom. A thermally expandable reinforcing material is carried by each shelf member. The arms are preferably configured such that a gap is realized between the reinforcing material of a first shelf member and an adjacent shelf member prior to expansion.

The configuration of the frame increases the heat transfer to the core of the material where it is needed most. The gaps provided allow the shelf members of the frame to absorb and transfer heat more efficiently to the reinforcing material. Additionally, the shelved frame provides support for the reinforcing material to reduce the potential of material sag due to gravity during the expanding and curing process.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is an enlarged perspective view of the multi-tiered reinforcing structure of the first preferred embodiment of the present invention removed from the exemplary motor vehicle for purposes of illustration.

FIG. 4 is a perspective view of a portion of the exemplary motor vehicle of FIG. 1, shown again partially cut-away and now illustrated to include a multi-tiered reinforcing structure constructed in accordance with the teachings of a second preferred embodiment of the present invention.

DETAILED DESCRIPTION OF THE PREFERRED EMBODIMENTS

Figure 1:
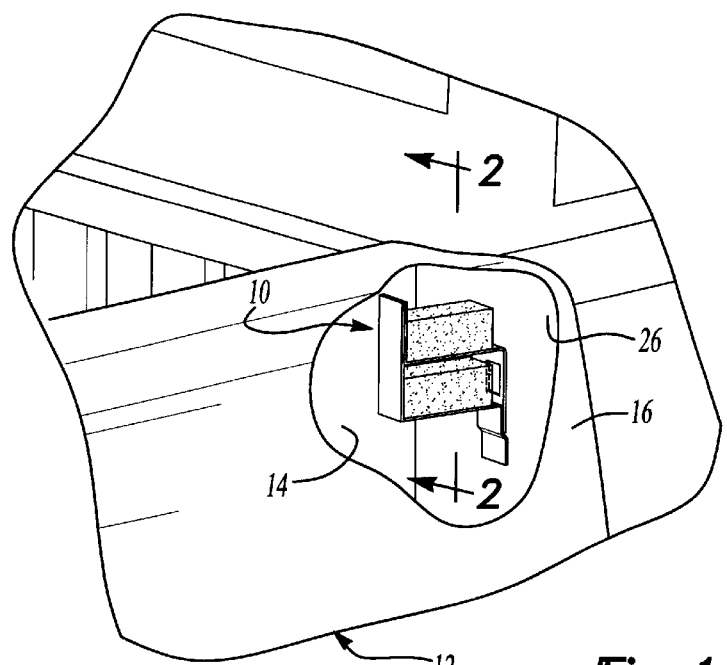
FIG. 1 is a perspective view of a portion of an exemplary motor vehicle shown partially cut-away, the motor vehicle incorporating a multi-tiered reinforcing structure constructed according to a first preferred embodiment of the present invention.

With initial reference to the perspective view of FIG. 1, a multi-tiered reinforcing structure constructed according to the teachings of a first preferred embodiment of the present invention is illustrated and generally identified at reference numeral 10. The reinforcing structure 10 is shown operatively incorporated into a portion of a motor vehicle 12. As particularly shown, the reinforcing structure 10 is fixedly attached to intermediate wall 26 between inner and outer panels 14 and 16 of a bed wall 18 of a pick-up truck 12. It should be readily appreciated by those skilled in the art that vehicle type and the location of the reinforcing structure as shown in FIG. 1 are merely exemplary. The reinforcing structure 10 provides localized stiffness to panels 14, 16, 18 and 26 of the vehicle 12.

Figure 2:
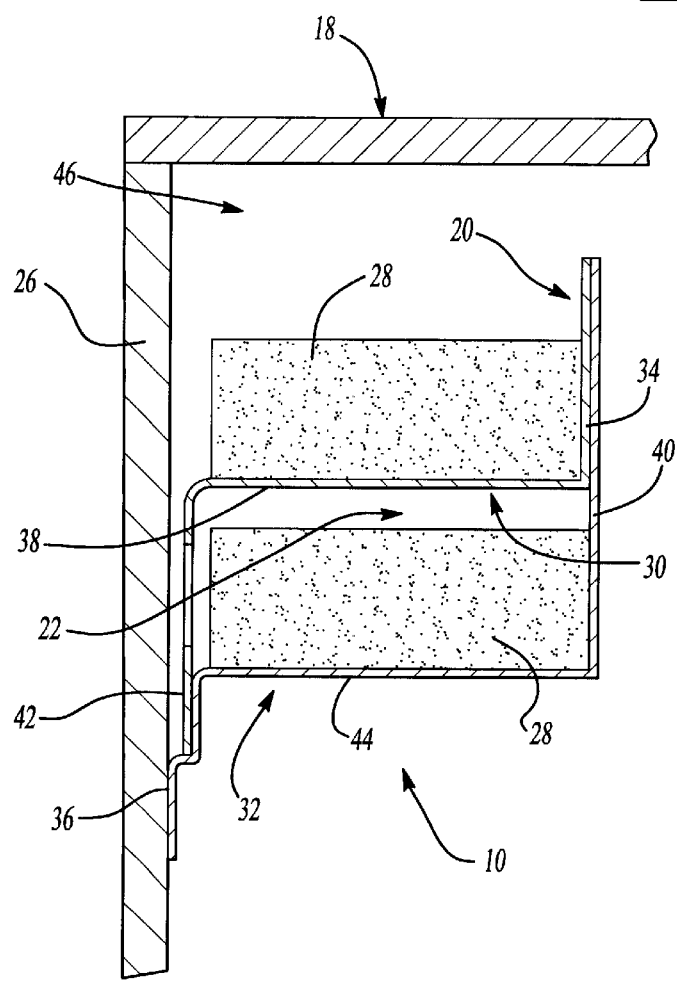
FIG. 2 is a cross-sectional view taken along the line 2—2 of FIG. 1.

With continued reference to FIG. 1, and additional reference to FIGS. 2 and 3, the reinforcing structure 10 of the present invention will be further described. The reinforcing structure is shown to generally include a frame 20 defined by multiple tiers for supporting portions of expandable material 28. In the exemplary embodiment illustrated, the frame 20 defines a two tiered configuration. However, it will be clearly understood that the subject invention may include three or more tiers.

In the first preferred embodiment, the frame 20 is preferably made of a rigid, heat conductive material such as metal, and includes a first or upper element 30 and a second or lower element 32. The first and second elements 30 and 32 are stepped in shape and welded or otherwise suitably secured to one another. More particularly, the first element 30 includes first and second vertically oriented flange portions 34 and 42 interconnected by a horizontally oriented arm or shelf member 38. Flange 42 includes an aperture or passageway 24 which allows expandable material 28 to expand therethrough. In a similar manner, the second element 32 includes first and second vertically oriented flange portions 40 and 36 interconnected by a horizontally oriented arm or shelf member 44.

The second flange portions 42 and 36 are welded together and cooperate to define a base or first mounting portion for the frame 20. As particularly shown in the cross-sectional view of FIG. 2, the reinforcing member is fixedly attached to panel 26 by flange 36, and disposed within a cavity 46 defined between the inner and outer panels 14 and 16. The expandable material 28 of first element 30 is configured to expand to contact wall 26. Similarly, the expandable material 28 of second element 32 is configured to expand through passageway 24 to contact panel 26. Those skilled in the art will recognize that flange 36 may alternatively be attached to panels 14, 16 or 18 without departing from the scope of this invention.

Portions of the expandable material 28 are disposed on the first and second arms 38 and 44. The expandable material 28 may be heat staked, pinned or otherwise attached to the arms 38 and 44. The expandable material 28 is a material that expands from heat such that is generated in automobile assembly plants during heat cycles. One suitable composition for use as the expandable material 28 is commercially available under the name SikaReinforcer from Sika Corporation of Madison Heights, Mich. However it will be recognized by those skilled in the art that other thermally expandable materials, including but limited to epoxy adhesives, may be employed without departing from the scope of the present invention. The portions of expandable material 28 are shown throughout the drawings in an unexpanded state (i.e., prior to the application of heat).

Significantly, the tiered configuration of the frame 20 allows the portions of the expandable material 28 to be placed apart from one another thereby facilitating expansion through enhanced thermal exposure. The expandable material 28 is preferably a dry, initially non-tacky material that develops adhesion upon expansion such that it adheres to the surrounding structural members when heat activated.

Figure 5:
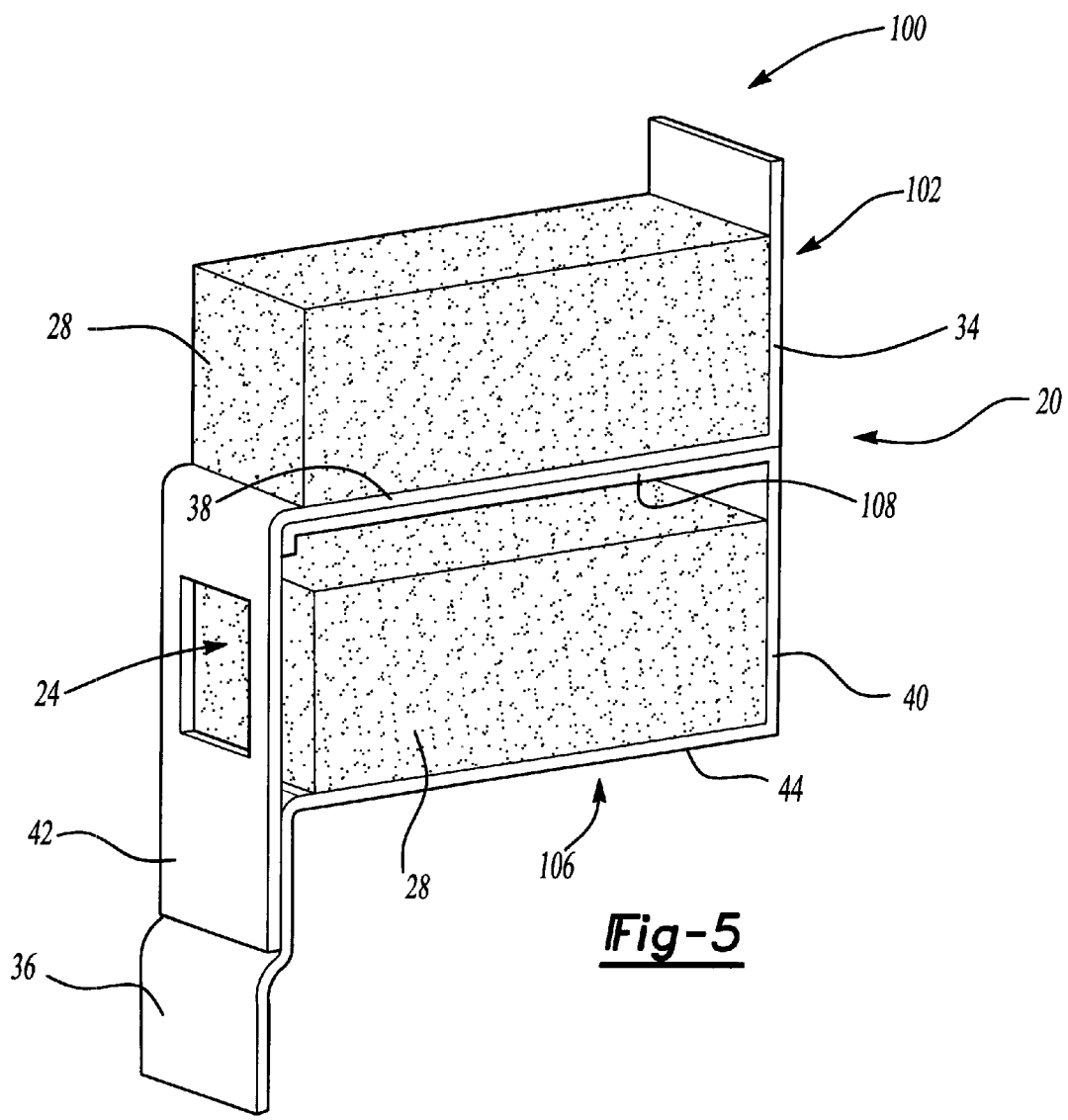
FIG. 5 is an enlarged perspective view of the multi-tiered reinforcing structure of the second preferred embodiment of the present invention.

With reference now to FIGS. 4 and 5, a reinforcing structure 10' constructed in accordance with the second preferred embodiment of the present invention is illustrated. The use and construction of the reinforcing structure 10' has many common aspects as compared to the reinforcing structure 10 of the first preferred embodiment. Like reference numbers have been used in the drawings to identify substantially identical components between the embodiments. The description of the reinforcing structure 10' of the second preferred embodiment will focus on the differences between the embodiments.

An upper element 30 of the frame 20' of the reinforcing structure 10' includes first and second vertical flanges 34 and 42. The first and second vertical flanges 34 and 42 are interconnected by a horizontal arm or shelf 38.

A lower element 32' of the frame 20' of the reinforcing structure 10' includes first and second vertical flanges 40' and 36. The vertical flanges 40' and 36 are interconnected by a horizontal arm or shelf 44'. In addition, the lower element 32' includes a horizontal portion 50 extending from an upper end of the first vertical flange 40'. The horizontal portion 50 is welded or otherwise securely attached to the arm 38 of the upper element 30. The reinforcing structure 10' is welded or suitably attached to panel 26 at flange 36 as described for the preferred embodiment.

Prior to installation in a vehicle, the reinforcing structures 10 and 10' of the present invention significantly provide an arrangement that can be preloaded with the reinforcing material 28. This type of arrangement facilitates assembly and helps to maintain desired spatial relationships.

As discussed above, the portions of the expandable material 28 are vertically offset a predetermined distance to enhance thermal exposure during heat activation. Explaining further, in the first preferred embodiment the first arm 38 and the second arm 44 are displaced at predetermined distance. The thermally expandable material 28 disposed on the first arm 38 occupies a predetermined height prior to expansion such that a gap 22 remains between the expandable material on the first arm 44 and the second arm 38 of the frame 20. The heat transfer characteristics of the frame and the spatial relationship therebetween allows for increased heat transfer properties during the activation process. Such a configuration promotes heat penetration to the core of the thermal expandable material 28. The tiered frame 20 furthermore provides intermediate support for the expandable material 28, which reduces the tendency of the material to slump from gravity during the expansion process.

Upon heating, the material 28 on the first arm 44 expands to substantially fill the surrounding area of cavity 46 and is forced laterally. Similarly, the material 28 substantially fills a space thereabove. Expansion of the thermally expandable material 28 is identical in the second preferred embodiment.

While the invention has been described in the specification that illustrated drawings with reference to particular preferred embodiments, it will be understood by those skilled in the art that various changes may be made and equivalence may be substituted for elements thereof without parting from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims. For example, while the embodiments described herein are illustrated in connection with a side wall of a pick-up truck, the reinforcing structures 10 and 10' according to this invention may be employed in other structural cavities as well (e.g., other areas in motor vehicles, boats, airplanes, or the like).

What is claimed is:

1. A reinforcing structure for a motor vehicle, the reinforcing structure comprising:
   a frame having at least first and second horizontally oriented shelf members; and
   first and second portions of thermally expandable reinforcing material disposed on the first and second shelf members, respectively, one of the first and second portions of reinforcing material disposed on one of the first and second shelf members so that it is facing the other of the first and second shelf members, the first and second portions of reinforcing material configured to expand upon exposure to heat;

wherein the one of the first and second portions of reinforcing material disposed on the at least one of the first and second shelf members so that it is facing the other one of the shelf members is disposed with a space between it and the other one of the shelf members and disposed in sufficient amount so that upon exposure to heat it expands to fill the space between it and the other of the first and second shelf members.

2. The reinforcing structure of claim 1, wherein the frame further includes a base for connecting the first and second shelf members to a first panel of the motor vehicle.

3. The reinforcing structure of claim 2, wherein the frame further includes first and second interconnected vertical flanges for connecting the first shelf member to the second shelf member.

4. The reinforcing structure of claim 1, wherein the frame includes first and second elements each having a step configuration, the first element including the first shelf member and the second element including the second shelf member.

5. The reinforcing structure of claim 4, wherein the first element includes a vertical flange secured to a vertical flange of the second element.

6. The reinforcing structure of claim 5 wherein the vertical flange of the first element further includes a passageway such that the reinforcing material expands therethrough upon exposure to heat.

7. The reinforcing structure of claim 4, wherein the second element includes a horizontal member secured to the first shelf member.

8. A reinforcing structure for a motor vehicle, the reinforcing structure comprising:

a frame having first and second stepped elements connected together in spaced relation by vertical flanges on opposed sides, each stepped element including a horizontal shelf member;

first and second portions of thermally expandable reinforcing material disposed on the shelf members of the first and second stepped elements, respectively, the first and second portions of reinforcing material expanding upon exposure to heat;

the second portion of reinforcing material disposed on the shelf member of the second stepped element between the second stepped element and the first stepped element with a space between the second portion of the reinforcing material and the first stepped element; and the second portion of reinforcing material disposed in sufficient amount on the shelf member of the second stepped element so that when it expands upon exposure to heat, it fills the space between it and the first stepped element.

9. A reinforcing structure for a motor vehicle, the reinforcing structure comprising:

a frame having first and second elements each having a step configuration, the first element including a first horizontally oriented shelf member and the second element including a second horizontally oriented shelf member;

first and second portions of thermally expandable reinforcing material disposed on the first and second shelf members, respectively, one of the first and second portions of reinforcing material disposed on one of the first and second shelf members so that it is facing the other of the first and second shelf members, the first and second portions of reinforcing material configured to expand upon exposure to heat; and the first element including a vertical flange secured to a vertical flange of the second element, the vertical flange of the first element further including a passageway such that the reinforcing material expands therethrough upon exposure to heat.

* * * * *